United States Patent

Foster

[15] 3,685,735
[45] Aug. 22, 1972

[54] IRRIGATING APPARATUS
[72] Inventor: Harry C. Foster, Northridge, Calif.
[73] Assignee: Hersey Products, Inc., Dedham, Mass.
[22] Filed: Nov. 2, 1970
[21] Appl. No.: 86,128

[52] U.S. Cl. .................239/109, 239/114, 239/534, 239/542
[51] Int. Cl......B05b 15/02, F23d 11/34, F23d 13/28
[58] Field of Search......239/106, 107, 108, 109, 116, 239/117, 450, 542

[56] References Cited

UNITED STATES PATENTS

| | | | |
|---|---|---|---|
| 3,203,629 | 8/1965 | Goddard | 239/109 |
| 3,351,292 | 11/1967 | Stuart, Sr. | 239/534 |
| 2,311,833 | 2/1943 | Letz | 239/534 |
| 2,890,838 | 6/1959 | Jannsen | 239/534 |
| 3,214,102 | 10/1965 | Meyer | 239/534 |
| 3,365,138 | 1/1968 | Green | 239/534 |
| 3,268,172 | 8/1966 | Goyette | 239/109 |
| 3,518,831 | 7/1970 | Tibbals, Jr. et al. | 239/542 X |

Primary Examiner—Lloyd L. King
Attorney—White, Haefliger & Bachand

[57] ABSTRACT

The invention concerns an irrigating system and emitters to communicate with a liquid supply line in the system, each emitter comprising:
  a. an emitter body having a bore, an inlet and an outlet communicating with the bore,
  b. a first element carried by said body and defining an orifice in said bore, and a pin element projecting in said orifice,
  c. said elements being relatively movable between a metering position in which liquid flow through the orifice is metered, and a flush position in which the effective orifice area is substantially increased to pass particulate material to said outlet,
  d. there being structure transmitting yieldable force in a direction to counteract the pressure of said liquid and urging at least one of the elements toward said flush position.

13 Claims, 5 Drawing Figures

PATENTED AUG 22 1972 3,685,735
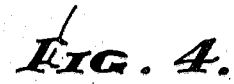
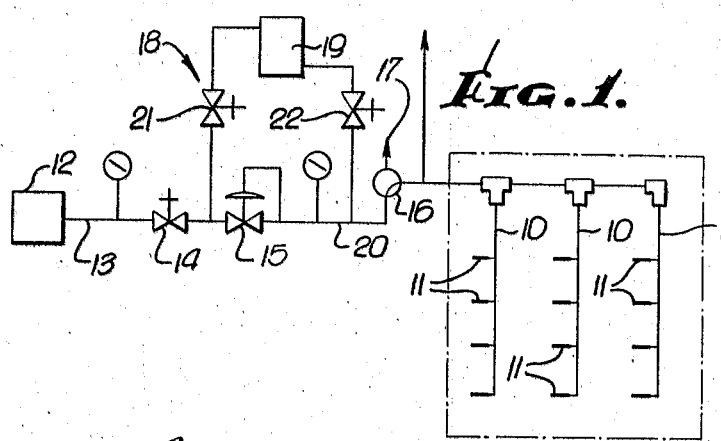
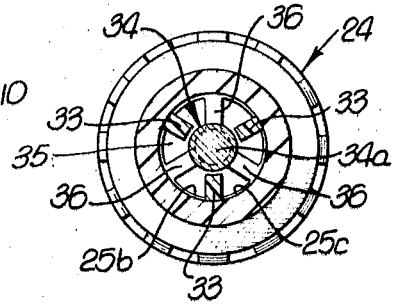
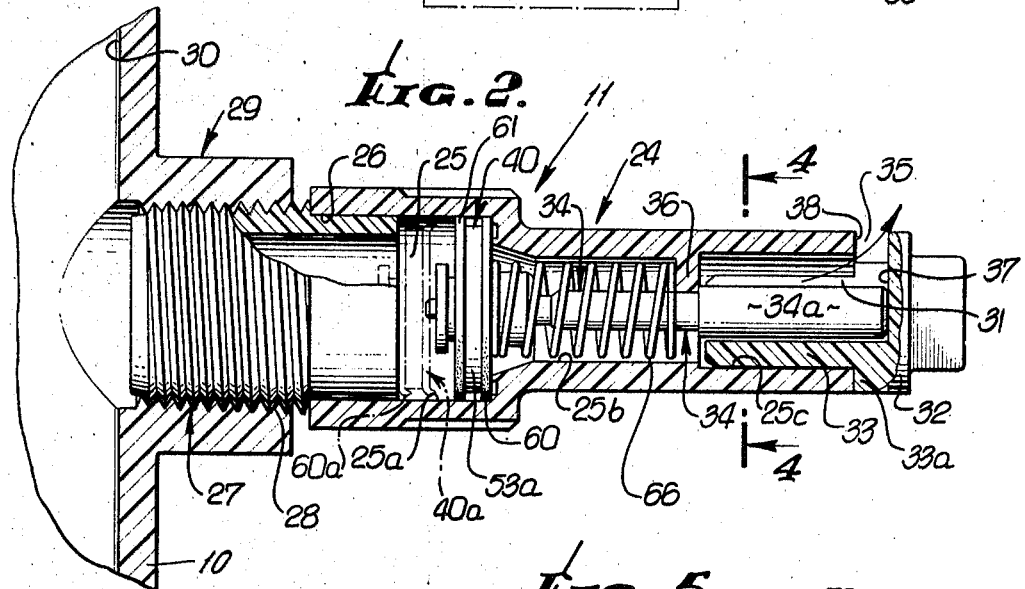
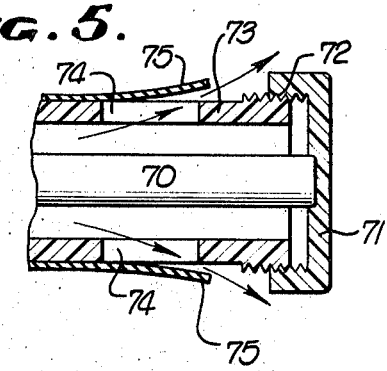
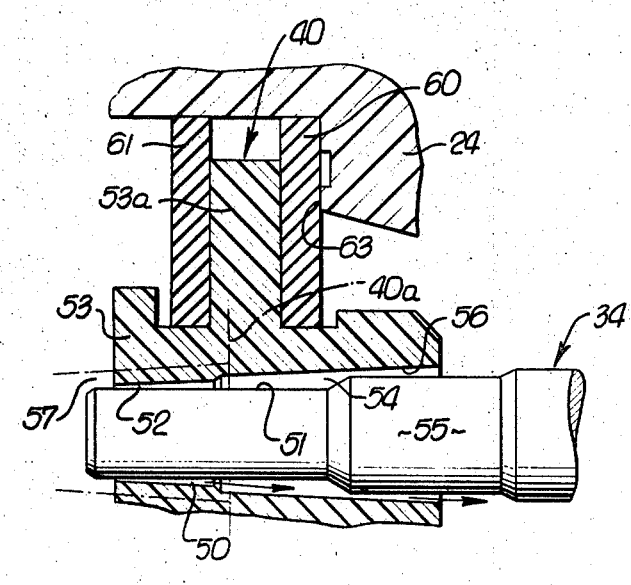
INVENTOR.
HARRY C. FOSTER
BY
White, Haefliger & Bachand
ATTORNEYS.

3,685,735

IRRIGATING APPARATUS

BACKGROUND OF THE INVENTION

This invention relates generally to irrigation control, and more particularly concerns self-flushing apparatus for controlling irrigation at relatively slow flow rates.

Recently, so-called "drip" irrigation has come to be recognized as a superior method of supplying water, or water plus nutrients, to plant life, the aim being to save water, increase crop yield, save labor cost and improve ecology through elimination of waste water run-off that can carry insecticides into streams and rivers. There has thus developed a need for drip irrigation systems which are economical to install, which offer long-term reliability, and which remain fully operable despite foreign particulate matter in the water supply, variances in water pressure, and wide ranges of topographical conditions and soil conditions. To my knowledge, no prior system embodies the unusual improvements in system and emitter construction, function and results as has now been provided through the present invention which fully meets the above need.

SUMMARY OF THE INVENTION

It is a major object of the invention to provide an improved irrigation system, overcoming problems associated with prior systems, and including a liquid supply line and multiple emitters communicating with he line at spaced intervals, each emitter comprising:

a. an emitter body having a bore, an inlet and an outlet communicating with the bore, b. a first element carried by said body and defining an orifice in said bore, and a pin element projecting in said orifice, c. said elements being relatively movable between a metering position in which liquid flow through the orifice is metered, and a flush position in which the effective orifice area is substantially increased to pass particulate material to said outlet, d. there being structure transmitting yieldable force in a direction to counteract the pressure of said liquid and urging at least one of the elements toward said flush position.

It is another object of the invention to provide improved emitters of the construction as referred to, and also embodying certain other unusually advantageous features as will be described. These include the provision of the first element in the form of a plunger movable in the emitter body bore relative to the pin element, the plunger having flexible seal engagement with the bore in flushing position to pass water and entrained particulate between the plunger and bore, for self-cleaning; the provision of an annular orifice defined by the plunger and pin, the orifice tapering to enable presetting of the pin location for selected metering to meet local irrigation needs; the provision of a check valve controlling the emitter outlet to pass water outwardly but block liquid and soil ingress into the emitter bore; and the provision of low-cost plastic emitter construction, as will appear.

These and other advantages of the invention, as well as the details of illustrative embodiments, will be more fully understood from the following detailed description of the drawings, in which:

DRAWING DESCRIPTION

FIG. 1 is a system diagram;

FIG. 2 is an elevation taken in section to show interior construction of one form of emitter embodying the invention;

FIG. 3 is an enlarged view showing orifice design;

FIG. 4 is a section taken on line 4—4 of FIG. 2; and

FIG. 5 is a fragmentary showing of a modified emitter.

DETAILED DESCRIPTION

Referring first to FIG. 15 the overall representative system includes one or more liquid supply or distribution lines 10 and emitters 11 communicating with the lines at spaced intervals corresponding to plant or tree locations. The lines 10 may consist of plastic tubing to which liquid such as water is supplied from a source 12. The main line 13 from the supply to distribution lines 10 may incorporate a main shut-off valve 14, pressure regulator 15, and cycling valve 16, as shown. The latter may for example be defined by a three-way valve capable of connecting lines 11 to water supply in one position, and connecting the lines 10 to a vent 17 in another valve position, whereby the emitters may be cycled between differential pressures to vary their orifices for flushing purposes, as will be described. Branch 18 communicates supply water to an additive supply 19, as for example nutrient solution, which is entrained and delivered back to the main line at 20 for distribution to the emitters. Valves 21 and 22 in the branch may be closed when nutrient flow is to be terminated.

Referring to the emitter 11 depicted in FIGS. 2–4, it comprises a plastic tubular body 24 having a bore 15 including sections 25a and 25b, the latter being of reduced diameter. A body inlet 26 may receive a plastic fitting or connection 27 bonded to the bore 26, and having threaded connection at 28 to a T 29 connected in series with the line 10, the bore 30 of the T being in alignment with line 10. The body outlet 31 may be remote from the inlet and T, as shown. At the end of the body a cap 32 may be supported by three circularly spaced integral fingers 33 fitting within and bonded to the bore extent 25c and in outwardly spaced relation to shank 34a of a pin element 34. Water, or water plus entrained nutrient passes from bore section 25c via the outlet 31 and the spaces 35 between the fingers and between the cap 32 and body 24 to the exterior for irrigation purposes.

The pin shank may be supported by the body webs 36 projecting radially in the bore, the pin for example having a press-fit to the inner terminals of these circularly spaced webs. Accordingly, the pin may be inserted to an axial position determined by pin end contact at 37 with the cap, or by pin shoulder contact with webs 36, whereby the axial location of the pin may be positively pre-determined by the axial position of the cap or webs on the body, different such positions corresponding to different axial locations of the pin, for selective metering control of flow through the orifice to be described. The spacing of the cap from the body end is determined by the dimensioning of the finger extents at 33a which have shoulder interfit with the body at 38.

An element, as for example a plunger 40 as shown, is carried by the body and defines an annular orifice in the bore 25, that element and the element being relatively movable between a metering position, as shown in solid lines in FIGS. 2 and 3, and a self-flushing position, as shown in broken lines 40a. In metering position, liquid flows through the orifice defining element, whereas in flush position the metering orifice area is substantially increased to pass entrapped particulate material to the outlet. In this regard, note in FIG. 3 the the reduced metering area at 50 between the smallest land 51 of the pin and the smallest bore 52 of the plunger part 53, and the metering area at 54 between the larger pin land 55 and the tapered bore 56 of the part 53. Those areas are each much smaller than the area at 57 between the pin land 51 and tapered bore 56 of the part 53 in broken-line flushing position 40a of that part.

Note that, in FIG. 2, the plunger includes a flexible annular washer 60 carried by part 53 in the manner shown in FIG. 3, the washer projecting generally outwardly and freely of the part to have flexible seal engagement with bore 25a. This enables axial deflection of the free extent of the washer, in flushing position as seen in broken lines at 60a in FIG. 2, to by pass water and entrapped particulate or other matter over the periphery of the washer for free flow to the outlet. A similar washer 61 is also carried by the part, and at the opposite side of the flange 53a of part 50, for flexible seal engagement with the bore. In metering position, the washer 60 seals against the body shoulder 63 between the stepped bore extents.

There is also structure transmitting yieldable force in a direction to counteract the liquid pressure and urging at least one of the pin and plunger elements toward flush position. In the illustration, a compression spring 66 is confined between webs 36 and the plunger 40 to urge the latter toward flush position, shifting of the plunger occurring when the water pressure drops sufficiently to let the spring dominate. Note that the plunger may move radially back and forth slightly as it is moved axially, as accommodated by the looseness of fit to the pin and the flexible free extents of the washers, whereby particulate material at the orifice may be loosened for flushing.

It is also clear that if the location of the pin is varied from that shown, as by installation to different axial location, the size of the orifice 54 may be varied, producing a change in the slow flow rate of liquid to the outlet. For example, if the pin 34 in FIG. 3 were moved to the left, orifice 54 would become smaller than orifice 50. In this regard, the form of the invention shown in FIG. 5 provides for controllable shifting of pin position in the field. The pin 70 is attached to cap 71 which has threaded connection at 72 to the emitter body 73, whereby rotation of the cap results in axial shifting of the pin. Outlets in the body appear at 74. A check valve to pass liquid out, but block reverse flow, takes the form of a flexible sleeve 75 surrounding the outlet parts 74. Internal liquid pressure resiliently expands the sleeve to allow water escape, but during shut-down the sleeve closes about the ports to prevent ingress.

Typical flow rates of an emitter for certain irrigation purposes would be between 1 and 4 gallons per hour.

I claim:

1. An irrigating system including a liquid supply line and emitters communication with said line at spaced locations therealong, each of said emitters comprising
   a. an emitter body having a bore, an inlet and an outlet c communicating with the bore,
   b. a first element carried by said body and defining an orifice in said bore, and a pin element projecting in said orifice,
   c. said elements being relatively movable between a metering position in which liquid flow through the orifice is metered, and a flush position in which the effective orifice area is substantially increased to pass particulate material to said outlet,
   d. there being structure transmitting yieldable force in a direction to counteract the pressure of said liquid and urging at least one of the elements toward said flush position
   e. there being a by-pass formed around said orifice in the flush position of said elements to pass liquid from the inlet to the outlet independently of the orifice, said by-pass being closed in response to element relative movement to metering position.

2. The system of claim 1 including means to supply pressurized water and nutrient solution to said line.

3. The system of claim 2 including means alternately to connect said line to said water supply means and to a vent.

4. The system of claim 1 wherein said first element comprises a plunger movable in said bore relative to said pin element, the plunger having flexible seal engagement with the bore in said flushing position to pass said liquid and any foreign matter between the plunger and bore, the plunger exposed to liquid pressure acting to displace the plunger toward said metering position.

5. The system of claim 4 wherein said plunger comprises a tubular part and a flexible elastomer washer carried by said part to project radially generally outwardly thereof.

6. An irrigating system including a liquid supply line and emitters communicating with said line at spaced locations therealong, each of said emitters comprising
   a. an emitter body having a bore, an inlet and an outlet communicating with the bore,
   b. a first element carried by said body and defining an orifice in said bore, and a pin element projecting in said orifice,
   c. said elements being relatively movable between a metering position in which liquid flow through the orifice is metered, and a flush position in which the effective orifice area is substantially increased to pass particulate material to said outlet,
   d. there being structure transmitting yieldable force in a direction to counteract the pressure of said liquid and urging at least one of the elements toward said flush position,
   e. said first element comprising a plunger movable in said bore relative to said pin element, the plunger having flexible seal engagement with the bore in said flushing position to pass said liquid and any foreign matter between the plunger and bore, the plunger exposed to liquid pressure acting to displace the plunger toward said metering position, said plunger comprising a tubular part and a flexible elastomer washer carried by said part to project radially generally outwardly thereof, said part having a bore axially receiving the pin in said metering position and to define an annular orifice with axial taper.

7. The system of claim 1 including a check valve controlling said outlet to pass liquid from the body interior to the body exterior and to block liquid passage from the body exterior to the body interior.

8. A self-cleaning liquid emitter, comprising
   a. a body having a bore, an inlet and an outlet communicating with the bore,
   b. a first element carried by the body and defining an orifice in said bore, and a pin element projecting in said orifice,
   c. said elements being relatively moveable between a metering position in which liquid flow through the orifice is metered, and a flush position in which the effective orifice area is substantially increased to pass particulate material to said outlet,
   d. there being structure transmitting yieldable force in a direction to counteract the pressure of said liquid and urging at least one of the elements toward said flush position,
   e. there being a by-pass formed around said orifice in the flush position of said elements to pass liquid from the inlet to the outlet independently of the orifice, said by-pass being closed in response to element relative movement to metering position.

9. The emitter of claim 8 wherein said first element comprises a plunger movable in said bore relative to said pin element, the plunger having flexible seal engagement with the bore in said flushing position to pass said liquid and any foreign matter between the plunger and bore, the plunger exposed to liquid pressure acting to displace the plunger toward said metering position.

10. A self-cleaning liquid emitter, comprising
    a. a body having a bore, an inlet and an outlet communicating with the bore,
    b. a first element carried by the body and defining an orifice in said bore, and a pin element projecting in said orifice,
    c. said elements being relatively movable between a metering position in which liquid flow through the orifice is metered, and a flush position in which the effective orifice area is substantially increased to pass particulate material to said outlet,
    d. there being structure transmitting yieldable force in a direction to counteract the pressure of said liquid and urging at least one of the elements toward said flush position,
    e. said first element comprising a plunger movable in said bore relative to said pin element, the plunger having flexible seal engagement with the bore in said flushing position to pass said liquid and any foreign matter between the plunger and bore, the plunger exposed to liquid pressure acting to displace the plunger toward said metering position, said plunger comprising a tubular part and a flexible elastomer washer carried by said part to project radially generally outwardly thereof.

11. The emitter of claim 10 wherein said part has a bore axially receiving the pin in said metering position and to define an annular orifice with axial taper.

12. The emitter of claim 8 including a check valve controlling said outlet to pass liquid from the body interior to the body exterior and to block liquid passage from the body exterior to the body interior.

13. A self-cleaning liquid emitter, comprising
    a. a body having a bore, an inlet and an outlet communicating with the bore,
    b. a first element carried by the body and defining an orifice in said bore, and a pin element projecting in said orifice,
    c. said elements being relatively movable between a metering position in which liquid flow through the orifice is metered, and a flush position in which the effective orifice area is substantially increased to pass particulate material to said outlet,
    d. there being structure transmitting yieldable force in a direction to counteract the pressure of said liquid and urging at least one of the elements toward said flush position,
    e. said first element being movable relative to the pin, and including adjustable means to controllably move the pin axially in the bore to controllably vary the orifice area in said metering position of the elements, the pin diameter varying along its length.

* * * * *